United States Patent [19]
Ferris et al.

[11] 4,047,839
[45] Sept. 13, 1977

[54] TORQUE REACTING MEANS FOR THE HUBS OF CROSS BEAM ROTORS

[75] Inventors: Donald Leroy Ferris, Newtown; William Lawrence Noehren, Huntington, both of Conn.

[73] Assignee: United Technologies Corporation, Hartford, Conn.

[21] Appl. No.: 691,251

[22] Filed: May 28, 1976

[51] Int. Cl.² .................. B64C 27/48; B64C 27/38
[52] U.S. Cl. ............................ 416/134 A; 416/141; 416/214 R; 416/226
[58] Field of Search .................. 416/134, 134 A, 141, 416/214, 138 A, 138, 226, 230, 229, 241 A

[56] References Cited

U.S. PATENT DOCUMENTS

| 3,307,634 | 3/1967 | Bihlmire | 416/134 |
| 3,384,185 | 5/1968 | Fernandez | 416/134 |
| 3,409,489 | 11/1968 | Renton | 416/134 |
| 3,669,566 | 6/1972 | Bourquardez et al. | 416/134 |
| 3,743,440 | 7/1973 | Moore | 416/230 X |
| 3,762,834 | 10/1973 | Bourquardez et a. | 416/134 |
| 3,874,815 | 4/1975 | Baskin | 416/134 |
| 3,880,551 | 4/1975 | Kisovec | 416/134 |
| 3,999,887 | 12/1976 | McGuire | 416/134 A |
| 4,008,980 | 2/1977 | Noehren et al. | 416/230 X |

FOREIGN PATENT DOCUMENTS

| 759,185 | 1/1934 | France | 416/134 |
| 1,190,259 | 4/1970 | United Kingdom | 416/134 A |

Primary Examiner—Everette A. Powell, Jr.
Attorney, Agent, or Firm—Maurice B. Tasker; Vernon F. Hauschild

[57] ABSTRACT

A helicopter cross beam rotor is shown including upper and low coaxial composite blade spars at right angles secured by tension bolts which pass through the composite spars and are held by threaded nuts to a rotor hub at the upper end of a rotor drive shaft. A metal cap plate above the upper spar and a spar-to-spar filler piece are also provided. Torque between the spars and the rotor hub is reacted by intermeshing ribs and grooves on the confronting faces of the hub, the filler piece and the cap plate. The bolt holes in the composite spars are oversize so that the bolts do not react torque between the rotor hub and the composite spars.

11 Claims, 4 Drawing Figures

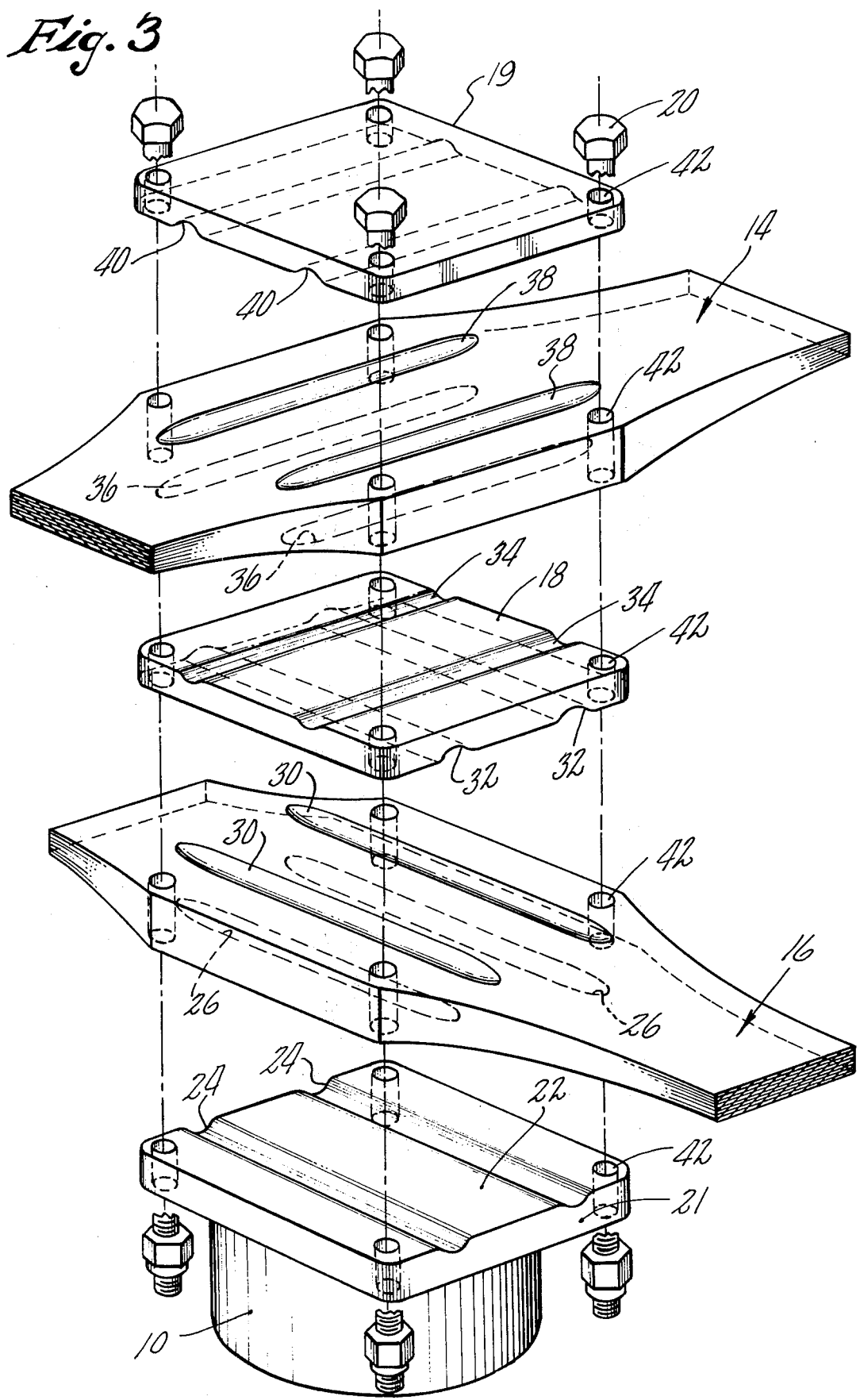

TORQUE REACTING MEANS FOR THE HUBS OF CROSS BEAM ROTORS

BACKGROUND OF THE INVENTION

1. Field of the Invention

This invention relates to cross beam rotors for helicopters which utilize composite rotor spars.

2. Description of the Prior Art

Heretofore helicopters having cross beam spars of composite material were attached to the rotor hub by a large number of bolts because these bolts were required to transmit torque between the rotor drive shaft and the blades and hence were subjected to heavy shear loads. Also the lug areas where the bolts passed through the material of the composite spars were required to be reinforced to transmit this hub to spar torque. Due to the large number of bolts required too many critical longitudinal fibers of the blade spars were interrupted by the bolt holes, requiring many cross patterned layers of composite build-up to strengthen these areas as a shear lug definition and for bearing of the bolts. This is an expensive time-consuming, weight-penalty operation.

SUMMARY OF THE INVENTION

It is an object of this invention to provide an improved construction for reacting the torque between the rotor hub and the blade spars of a cross beam rotor in which composite spars are used.

It is a further object of this invention to provide a cross beam rotor construction in which the tension bolts which pass through the blade spars for securing them to the rotor hub are not required to react the rotor torque and consequently can be fewer in number and smaller in size for a four-bladed cross beam rotor.

It is another object of this invention to greatly simplify the fabrication of the composite spars in the hub area while at the same time providing superior torque transmission between the rotor hub and the blade spars.

To this end the confronting surfaces of the blade hub structure are provided with intermeshing ribs and grooves which greatly increase the shear area in the composite material of the blade spars.

BRIEF DESCRIPTION OF THE DRAWINGS

FIG. 3 is an exploded view of the hub portion of the rotor shown in FIGS. 1 and 2.

DESCRIPTION OF THE PREFERRED EMBODIMENT

Figure 1:
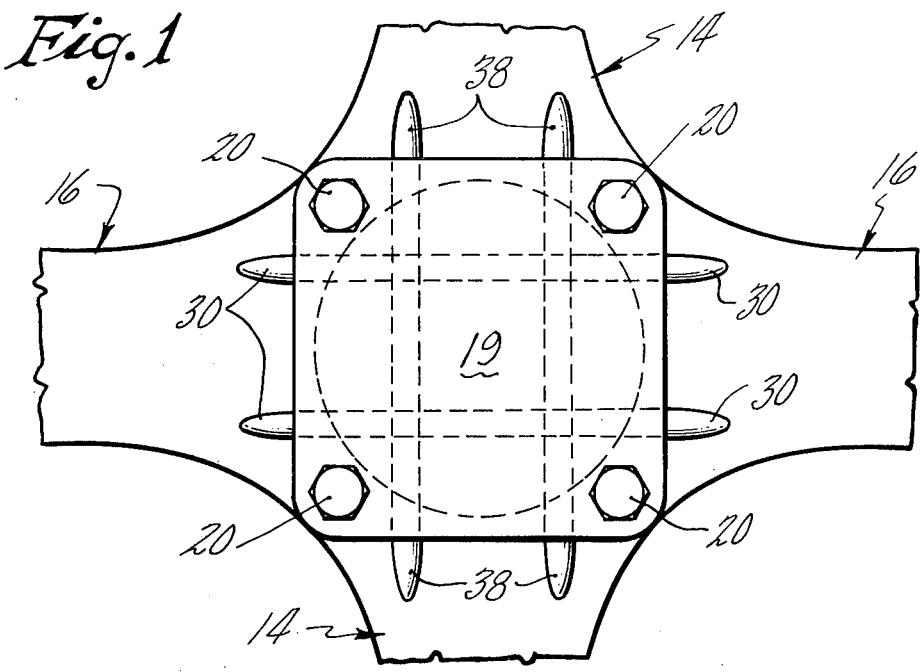
FIG. 1 is a plan view of a cross beam rotor, the outboard portions of the blades being broken away to facilitate illustration.
Figure 2:
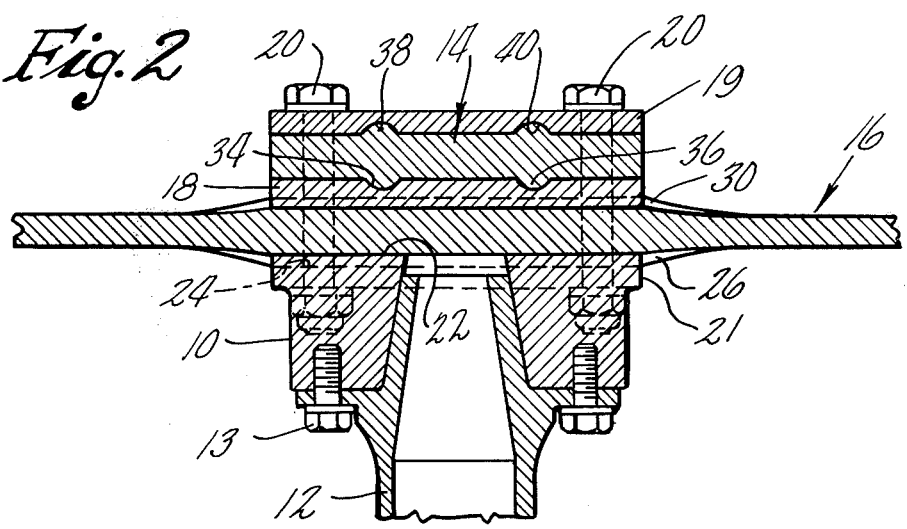
FIG. 2 is a sectional elevation of the rotor shown in FIG. 1.
Figure 4:
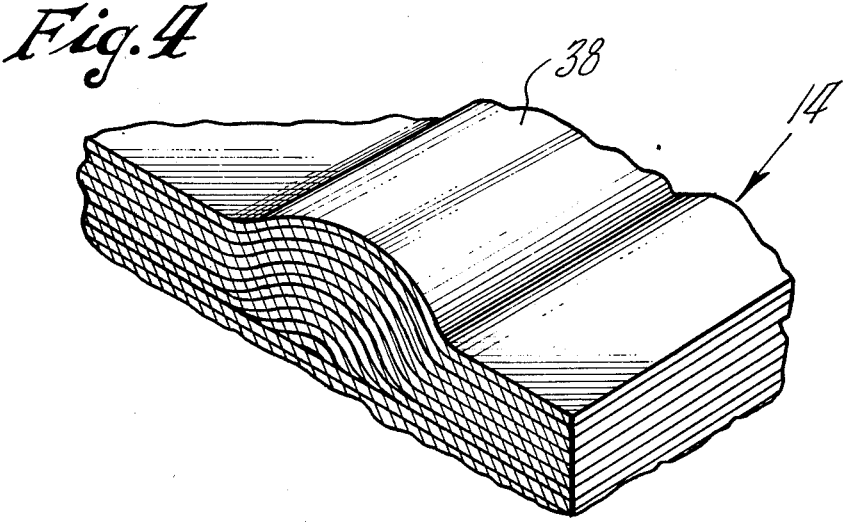
FIG. 4 is a partial section of a blade spar showing the raised rib composite construction.

Referring first to FIGS. 1 and 2, 10 is the rotor hub lower element which is made of metal, such as aluminum alloy, and is fixed to the upper end of drive shaft 12 by a plurality of bolts 13, two of which show in FIG. 2. Upper and lower cross beam rotor blade spars 14 and 16, a spar-to-spar filler piece 18 and a top bearing cap 19 complete the rotor hub elements. Tension bolts 20 pass through hub elements, 19, 14, 18 and 16 in that order and are bolted with threaded nuts below a flange 21 on lower hub element 10 as shown in FIG. 3.

Blade spars 14 and 16 each are of composite material construction with a thickened and widened hub portion. The flat upper surface 22 of rotor hub lower element 10 has two semi-circular grooves 24 machined therein which mate with rubs 26 laminated as part of the under side of the hub portion of lower composite blade spar 16. These ribs extend longitudinally of the blade spar 16. The upper surface of blade spar 16 has two semi-circular ribs 30 laminated as part of the upper side of its hub portion which are parallel with ribs 26. Ribs 30 mate with grooves 32 machined in the under surface of filler piece 18. The upper surface of filler piece 18 has two grooves 34 machined therein which are at 90° to grooves 32. Grooves 34 mate with ribs 36 (not visible in FIG. 3 but shown in FIG. 2) laminated as part of the lower surface of the hub portion of upper composite blade spar 14. The upper surface of the blade spar 14 has semi-circular ribs 38 laminated as part of its hub portion which mate with grooves 40 machined in the lower surface of top bearing cap 19. It will be noted that ribs 26 and 30 on composite blade spar 16 and ribs 36 and 38 on composite upper blade spar 14 are directed longitudinally of the blades and since they are laminated as part of the composite material of the spars no fibers are cut by these ribs.

Holes 42 for the four bolts 20 are provided at the four corners of the rotor hub elements. These holes in the composite material of both blade spars and the blade-to-blade filler piece are oversize so that the bolts 20 cannot transmit any torque loads directly to the blade spars 14 and 16. It will be noted that the oversize bolt holes pass through upper and lower composite blade spars 14 and 16 outside the critical longitudinal fibers.

While in this preferred embodiment two mating ribs and grooves have been shown between the confronting surfaces of the rotor hub elements, it will be understood that a larger number or a single mating rib and groove could be used; also instead of mating ribs and grooves of the semi-circular cross section a different cross sectional shape could be used. Formed stainless steel chafing strips may be bonded to all mating rib and groove surfaces in the composite material if desired. In the rotor illustrated these chafing strips are not needed and have not been shown.

In the operation of our improved rotor, all torque reactions between the blades and the rotor hub are taken by the ribbed and grooved surfaces of the various hub elements. The oversize holes in the composite material for tension bolts 20 prevent these bolts from transmitting torque loads into the composite material of the blade spars. Since these bolts are essentially tension members, only four bolts are needed and the four bolts shown are located in the corners of the widened and thickened hub portions where their holes do not sever critical longitudinal fibers of the blade spars 14 and 16. The lug areas surrounding the bolt holes 42 in the composite material do not have to be reinforced in making the blades, since they have no part in transmitting torque loads.

While we have shown and described in considerable detail one embodiment of our invention, we do not want to be limited to the details elaborated herein as many variations in construction will occur to those skilled in this art which fall within the scope of the appended claims.

We claim:

1. A cross beam rotor for helicopters comprising a rotor hub lower element, a composite lower blade spar, a composite upper blade spar, a blade-to-blade filler piece, and a rotor hub upper element, said upper and lower blade spars, said filler piece and said rotor hub upper and lower elements having aligned passages therein, tension fasteners extended through said passages, said passages in said blade spar and said filler piece having a diameter greater than the diameter of said fasteners, and means on the confronting faces of said rotor hub elements, said filler piece and said spars for reacting hub to spar torque.

2. The combination of claim 1 in which the means for reacting hub to spar torque comprises mating ribs and grooves on said hub elements, said filler piece and said spars.

3. The combination of claim 2 in which the ribs and grooves are laminated in the composite material and run lengthwise of said blade spars.

4. The combination of claim 2 in which the ribs are formed on the blade spars and the mating grooves are formed on the hub elements and said filler piece.

5. The combination of claim 1 in which each blade spar has a wider hub portion which extends laterally beyond the required width of said spars and said passages are located in said wider portions outside the critical longitudinal fibers of said spars.

6. A hub structure for cross beam helicopter rotors comprising stacked hub elements, said elements including a rotor hub lower element, a lower blade spar element, a transition element, an upper blade spar element, and a rotor hub upper element, means for transmitting torque between said rotor hub lower and upper elements and said intermediate elements including mating ribs and grooves on the confronting faces of said hub elements, and means for clamping said stacked elements together including tension members extended through passages in said stacked elements out of torque reacting contact with said blade spar elements.

7. The combination of claim 6 in which the upper and lower blade spar elements and the transition element are composite material and the clamping means includes oversize passages in said composite material for receiving said tension members.

8. A cross beam rotor for helicopters comprising a rotor drive shaft, a rotor lower hub element fixed to said drive shaft, a rotor hub upper element, upper and lower cross beam blade spars of composite material between said upper and lower hub elements, each blade spar including a central hub portion of composite material which is thicker and wider than its spar, an interblade filler element of composite material between the hub portions of said blade spars, means for reacting torque forces between said rotor drive shaft and said blade spars comprising mating grooves and ribs on confronting faces of said rotor hub lower and upper elements and said blade spars and on the confronting faces of said filler element and said upper and lower blade spars, and tension bolts extended through aligned passages in said rotor hub elements, said filler element and the hub elements of said blade spars for clamping said elements to said rotor hub lower element, the passages in said rotor hub upper and lower elements, said hub portions of said spars and said filler element having a greater diameter than the diameter of said bolts.

9. In a cross beam rotor for helicopters, a rotor hub lower element having an outstanding flange, a lower composite blade element, the confronting faces of said hub element and said blade element having mating grooves and ribs thereon, a blade-to-blade filler element having grooves on its lower face which mate with ribs on the upper face of said lower blade element, said filler element having grooves on its upper face transverse to said grooves on its lower face, an upper composite blade element having ribs on its lower face mating with said grooves on the upper face of said filler element, and a rotor hub upper element having grooves in its lower face mating with ribs on the upper face of said upper blade element, said motor hub upper element, said blade elements, said filler element and the flange on said rotor lower hub element having aligned bolt passages therein, and bolts extended through said passages and clamping said elements togeher, said bolts having a diameter less than the diameter of the passages in said blade and filler elements.

10. A hub structure for cross beam helicopter rotors comprising stacked hub elements, said elements including a hub lower element, a lower blade spar element, a transition element, an upper blade spar element, and a rotor hub upper element, said upper and lower blade spar elements and said transition element being of composite material, said hub element having laterally extended hub portions which project beyond the critical longitudinal fibers of said spar elements, means for transmitting torque from said rotor hub lower element to said upper and lower blade spar elements including ribs and grooves on the confronting faces of said composite hub elements, means for clamping said stacked elements together including aligned passages in said hub elements located in said laterally extended hub portions of said elements outside the critical longitudinal fibers of said spar elements and tension members extended through said passages.

11. The rotor hub structure of claim 10 in which the upper amd lower blade spar elements and the transition element are of laminated composite material and the laminations in said blade spar elements continuous in said ribbed faces.

* * * * *